Sept. 12, 1939.　　　　　W. D. GROW　　　　　2,172,471
APPARATUS FOR SCALING FISH
Filed June 8, 1935　　　　2 Sheets-Sheet 2
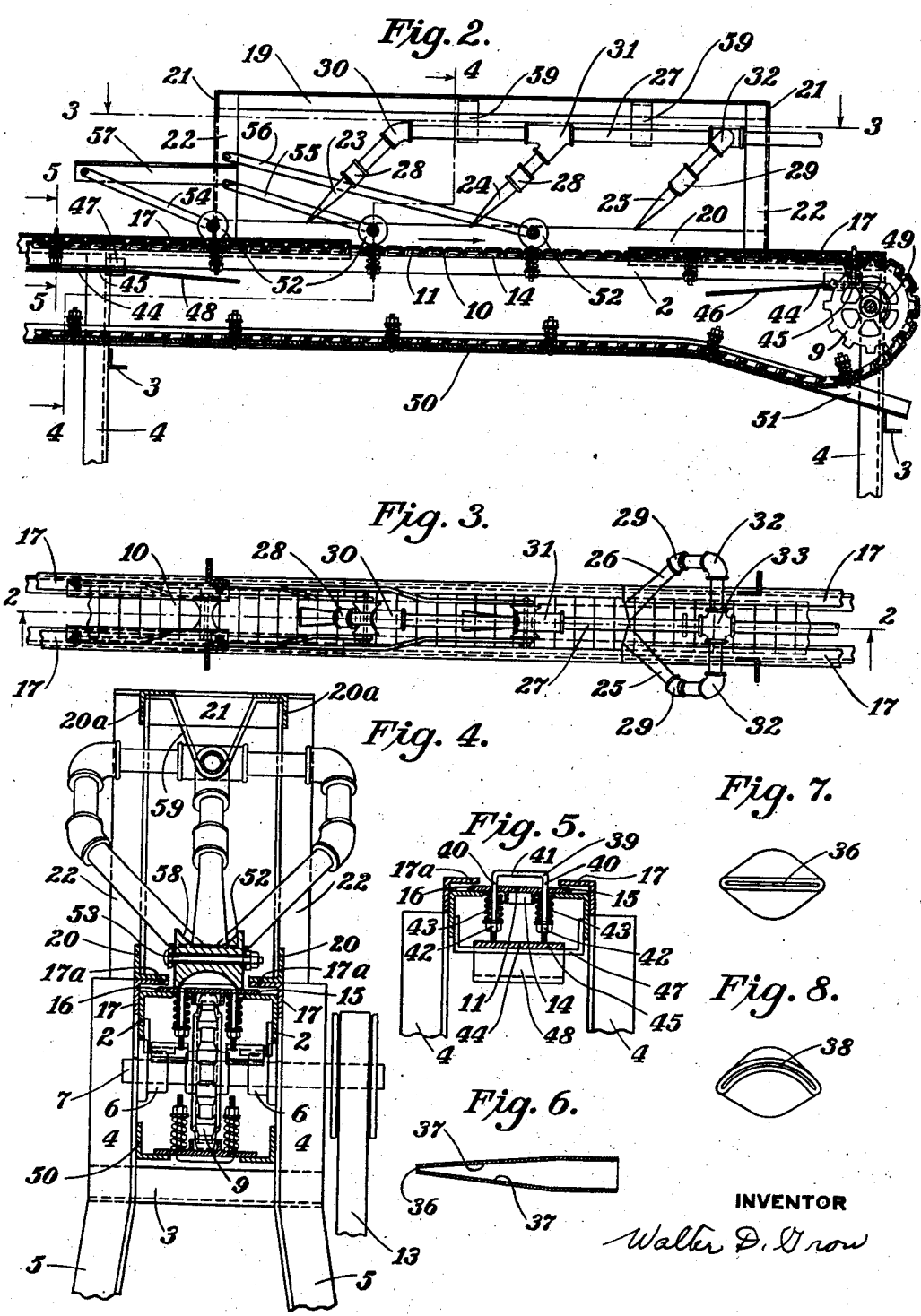
INVENTOR
Walter D. Grow Patented Sept. 12, 1939

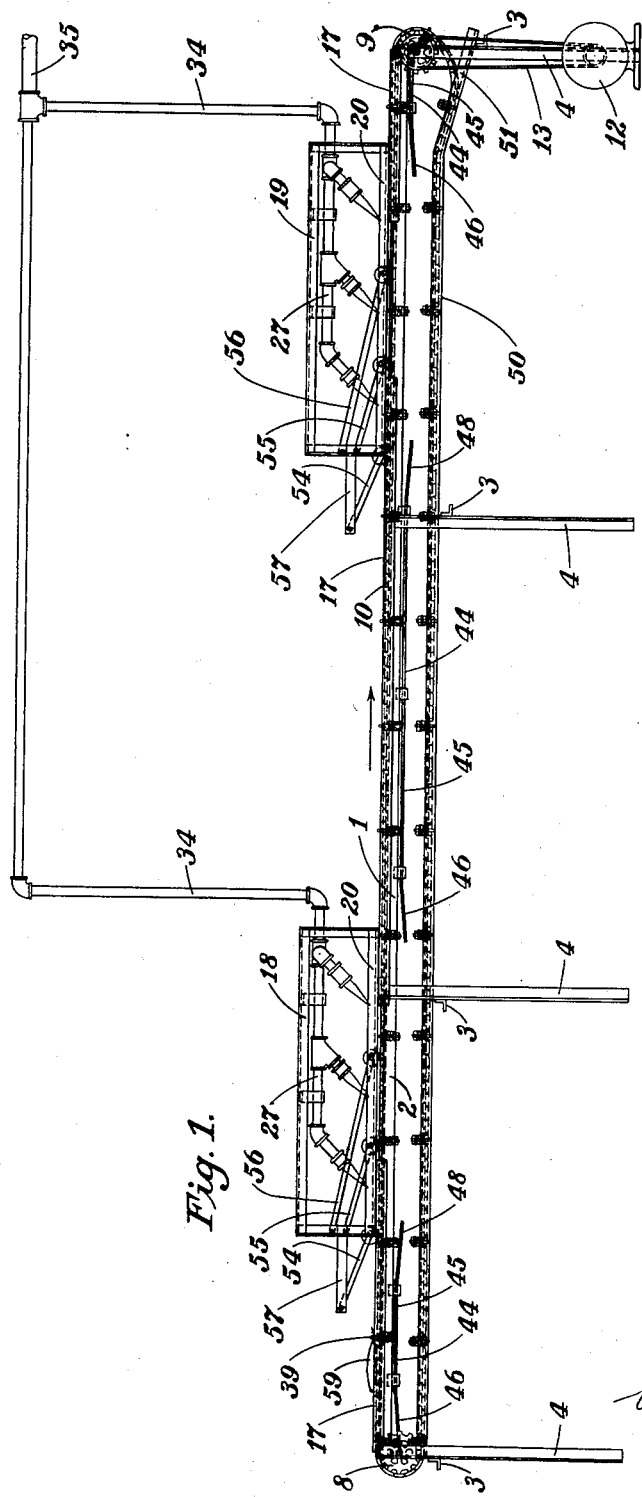

2,172,471

UNITED STATES PATENT OFFICE 2,172,471

APPARATUS FOR SCALING FISH

Walter D. Grow, Painesville, Ohio, assignor to Grow Bros., Painsville, Ohio, a partnership Application June 8, 1935, Serial No. 25,629

5 Claims. (Cl. 17—5)

This invention relates to an apparatus for removing scales from fish. The principal object of my invention comprises means for scaling fish by the use of a fluid or fluids under pressure.

Another object of my invention includes a series of nozzles for directing the fluid under pressure against the portion of the fish to be scaled and the provision of a movable belt to convey the fish beneath the nozzles. The invention also contemplates the provision of means for holding the fish on the belt and other means for operating the holding means so that the fish can be applied to and released from the belt at the desired points in its travel.

Another feature resides in novel provisions for guiding the fish under the nozzles and holding them in close proximity to the belt to prevent the force of the fluid from blowing the fish off the belt.

Other objects and advantages of my invention will be apparent from a detailed description of an embodiment of my invention illustrated in the attached drawings, in which:

Figure 1 is a view in elevation of the apparatus used in carrying out my invention.

Figure 2 is a view partly in elevation and partly in vertical section taken on line 2—2 of Figure 3.

Figure 3 is a horizontal sectional view taken on line 3—3 of Figure 2.

Figure 4 is a vertical section taken on line 4—4 of Figure 2.

Figure 5 is a vertical section taken on line 5—5 of Figure 2.

Figure 6 is a sectional view through one of the nozzles.

Figure 7 is an end view of a nozzle.

Figure 8 is an end view showing a modified form of nozzle.

Referring to the drawings, the supporting frame 1 comprises a pair of longitudinally extending members 2, 2 lateral members 3, 3 and legs 4, 4. The legs 4 are flared outwardly at their lower portions as at 5 to prevent tipping.

The members 2 and 3 and the legs 4 are shown in the form of standard sizes of angle iron welded together. It is of course obvious that other shapes of members may be used as well as various methods of fastening them together.

At each end of the frame there is mounted a pair of bearings 6,6 for receiving the journals 7, 7 of the sprocket wheels 8, 9. A conveyor belt 10, composed of individual links 11 pivotally connected together, runs over the sprocket wheels. The conveyor belt is driven by a motor 12 in the usual manner by means of a belt or chain 13.

Each link 11 has a recess 14 for receiving a tooth of sprocket wheels 8, 9, and lateral extensions 15, 16 resting on the top of members 2, 2. Fastened to the members 2, 2 are angle members 17, 17 each having a portion 17a thereof extending over the conveyor belt for a purpose to be later described. Mounted on the members 17, 17 are box-like frameworks 18, 19 also shown made of angle iron. Each frame-work comprises lower longitudinal members 20, 20 fastened to members 17, 17, upper longitudinal members 20a, 20a, lateral brace members 21, 21 and vertical members 22, 22. Inside of each framework 18, 19 is a series of nozzles 23, 24, 25 and 26. Nozzles 23 and 24 are positioned in a vertical plane parallel to the longitudinal axis of the conveyor belt and pointed downwardly at an angle toward said belt. Nozzles 25 and 26 are in vertical planes at an angle to the longitudinal axis of the conveyor belt and also point downwardly at an angle toward said belt. I have found that an angle of forty-five degrees to the horizontal for all of the nozzles will operate very satisfactorily and that nozzles 25 and 26 may be placed at a similar angle laterally of the belt. The nozzles are connected to a supply pipe 27 by means of the usual type of pipe fitting 28, 29, 30, 31, 32 and 33. Each pipe 27 is connected by means of pipe 34 to a main supply pipe 35.

Figures 6 and 7 show one of the nozzles in detail and it will be seen that a rectangular opening 36 is provided in one end which effects the discharge of a narrow stream of fluid from the nozzle. The inner walls 37 taper to the opening 36, thus keeping the fluid friction to a minimum. A modification of the nozzle is shown in Figure 8 in which the opening 38 is curved instead of being straight as is the opening 36.

I have shown my apparatus constructed so that the top of the belt will move from left to right as indicated by the arrows in Figures 1 and 2 although if sprocket 8 were driven by the motor, instead of sprocket 9 the belt would move from right to left and the machine would operate satisfactorily without rearranging the nozzles.

In operation, water, air or other fluid under pressure is passed through pipes 34 and 35 and thence through the nozzles from the ends of which are discharged thin streams of fluid. The fish are placed successively on the belt, tail first, as indicated at 59. They are carried by the belt beneath the fluid stream issuing from the nozzles in the framework 18, which lifts the scales and blows them from the uppermost half of the fish. At some point on the belt between the frameworks 18 and 19 the fish are turned over, after which the belt carries them beneath the nozzles in framework 19 where the fluid under pressure removes the scales from the other side of the fish. I have found that a pressure of around fifty pounds per square inch removes the scales very satisfactorily. This process removed all the scales from the fish without tearing or mutilating them in any way.

In order to prevent the fish from being blown from the belt I have provided means for holding them to the belt as they pass beneath the nozzles and means for releasing the holding means so that the fish can be placed on and removed from the belt at the desired points in its travel. The holding means illustrated comprises an inverted U-shaped clip member 39 (see Figures 4 and 5) with the arms 40, 40 of the member extending through a link 11 and the connecting portion 41 of the U resting on the top of the link. Each arm 40 is threaded to receive a nut 42 and a spring 43 is positioned between each nut and the under side of the link. The compression of the springs may be adjusted by means of the nuts. At each end of the frame 1 and between the frameworks 18, 19 I provide members 44 for a purpose to be later described. Each member 44 has a horizontal portion 45 and a downwardly sloping portion 46, and is rigidly held in position by means of cross bars 47 as shown in Figure 5. As the top of the belt moves from left to right the lower extremities of arms 40, 40 first engage one of the sloping surfaces 46, causing the clip 39 to move upwardly relative to the belt. Continued movement of the belt moves the clip upward until a horizontal portion 45 is reached, whereupon it moves horizontally with the belt. It will be seen that this camming action takes place before and after the clip reaches the framework 18 and after it has passed through framework 19. When the clip 39 is held in an upward position as above described the tail of a fish can be slipped beneath, or removed from beneath the connecting portion 41 of the clip. As the belt continues its movement the arms 40 will slide down other sloping surfaces 48 on the first two of the members 44. At points intermediate members 44 the compression of springs 43 will clamp the fish tightly to the belt. At the extreme right of the apparatus the horizontal part of member 44 is bent as at 49 (see Figure 2), the bent portion being spaced substantially the same distance from the belt as the horizontal part of the member. The purpose of this is to maintain clip 39 in a released position until the clip has passed well around the sprocket wheel, thus permitting the fish to drop by gravity into a receptacle placed to receive it.

It will be seen that the holding and releasing means permits the operator to place a fish on the belt as at 59, whereupon it will be tightly held to the belt as it passes through framework 18, the holding means being released as the fish emerges from framework 18 permitting it to be turned over and again gripped before entering framework 19. Coming out of the latter framework the holding means is again released leaving the fish free to fall from the belt.

I provide a series of clips 39 spaced apart slightly more than the length of the fish to be scaled. In order that they all be spaced the same number of links apart it may be necessary to add or take away links from the belt. The slack in the belt merely loops below the sprocket 9 and rides on sloping portions 51 of members 50, which members are provided to carry the belt on its return to sprocket 8.

In order to prevent the belt from moving upward during the time the springs are compressed by members 44, I provide the angle bars 17, 17. The portions 17a, 17a extending over the belt limit upward movement thereof. I have shown each member 17 extending only slightly beyond members 44, but it is obvious that for my purpose they may extend the entire length of members 2.

I have found that the force of the fluid is apt to move the free end of the fish about, and unless such movement is controlled considerable damage may be done to the fish. To overcome this difficulty I provide rollers 52 each pivotally mounted by means of bolts 53 on a pair of arms 54, 55 or 56. Arms 54 are pivotally supported by horizontal members 57 fastened to certain of the vertical members 22, whereas arms 55 and 56 are directly pivotally supported on certain of the members 22. Figure 4 shows one of the rollers in cross-section and it will be seen that the curved surface 58 is shaped so as to maintain the fish in a central position laterally of the belt. The weight of the arms and rollers will be sufficient to hold the free end of the fish against the belt. The rollers may be made of any material such as wood or metal and the weight will of course vary depending on the material used. I have found that aluminum rollers give very satisfactory results.

The speed of the belt may be any amount that will give the operator sufficient time to apply the fish to the belt as, for instance, sixty feet per minute. If necessary, a speed reducing gear may be used between the motor and the sprocket wheel drive shaft to obtain the proper speed.

The pipes and nozzles in frameworks 18 and 19 may be supported by means of straps 59. The entire apparatus, except the points at which the fish are applied and removed, can be enclosed with sheet metal and a trough provided beneath the belt to carry off the used water.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a fish scaling machine, a conveyor belt, a U-shaped member for holding the fish in contact with said belt, a spring cooperating with the arms of said member for urging said member into holding position and means adapted to move said member to releasing position.

2. In a fish scaling machine, a conveyor belt, a member having portions extending through said belt adapted to be moved to a position for holding fish in contact with said belt and adapted to be moved to a fish releasing position, spring means engaging said portions for urging said member into holding position and means constructed and arranged to move said member into fish releasing position.

3. In a fish scaling machine, fish conveying means, a member extending through said means adapted to be moved to a position for holding fish in contact with said belt and adapted to be moved to a fish releasing position, a spring beneath said conveying means urging said member into holding position and means adapted to contact said member to move the latter to fish releasing position.

4. Apparatus for scaling fish comprising means for holding the fish by the tail, and means directing a thin wall of fluid under pressure against the fish, in a direction away from the tail, to loosen the scales on the fish and to remove the scales therefrom, the thickness of said wall being relatively small as compared to the width thereof, and the wall of fluid corresponding substantially in curvature to the adjacent surface of the fish at which the fluid is directed.

5. In a fish scaling machine, means for moving fish in said machine, and means adapted to emit a thin stream of fluid under substantial pressure against the side of said fish and over the lateral extent thereof for separating the scales from said fish and for removing scales therefrom, said means including a nozzle structure having a width substantially the same as the greatest width of the fish to which said stream is to be applied, the stream having a configuration in cross section substantially corresponding to the curvature of the adjacent surface of the fish.

WALTER D. GROW.